United States Patent
Zhang et al.

(10) Patent No.: US 9,668,197 B2
(45) Date of Patent: May 30, 2017

(54) SYSTEM AND METHOD FOR WIRELESS NETWORK ACCESS MAP AND APPLICATIONS

(71) Applicant: Huawei Technologies Co., Ltd., Shenzhen (CN)

(72) Inventors: Hang Zhang, Nepean (CA); Xu Li, Nepean (CA); Alex Stephenne, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 14/249,181

(22) Filed: Apr. 9, 2014

(65) Prior Publication Data

US 2014/0308962 A1 Oct. 16, 2014

Related U.S. Application Data

(60) Provisional application No. 61/810,617, filed on Apr. 10, 2013.

(51) Int. Cl.
*H04W 48/16* (2009.01)
*H04W 40/02* (2009.01)
(Continued)

(52) U.S. Cl.
CPC ......... *H04W 40/246* (2013.01); *H04W 48/16* (2013.01); *H04W 40/02* (2013.01); *H04W 40/20* (2013.01)

(58) Field of Classification Search
CPC ... H04W 40/246; H04W 48/16; H04W 40/02; H04W 40/20; H04W 36/32; H04W 8/08
(Continued)

(56) References Cited

U.S. PATENT DOCUMENTS

| 7,051,095 B1 | 5/2006 | Cantwell |
| 2008/0161013 A1* | 7/2008 | Friman ................. H04W 48/14 455/456.1 |

(Continued)

FOREIGN PATENT DOCUMENTS

| CN | 1340936 A | 3/2002 |
| CN | 101247650 A | 8/2008 |
| CN | 101355473 A | 1/2009 |

OTHER PUBLICATIONS

International Search Report received in Application No. PCT/CN2014/075047, mailed Jul. 23, 2014, 12 pages.

*Primary Examiner* — Marisol Figueroa
(74) *Attorney, Agent, or Firm* — Slater Matsil, LLP (57) ABSTRACT

Embodiments are provided for a location-based network discovery and connection establishment, which take advantage of location/positioning technology of user equipment (UE) and resolve issues above of the blind search approaches. The location-based network discovery and connection establishment schemes use UE location information and a network access MAP to speed up network discovery, and remove the need for continuous search and measurement by the UE. The schemes also reduce the search space. A wireless network access map (MAP) is provided to the UE. The UE uses the MAP information with UE current location information to reduce the search space and speed up network discovery and radio connection establishment with the network. Network operators can use this network access MAP to control the network access and manage the network load distribution. The network access MAP can be customized for each UE.

42 Claims, 3 Drawing Sheets

(51) Int. Cl.
*H04W 40/20* (2009.01)
*H04W 40/24* (2009.01)

(58) Field of Classification Search
USPC ................................. 455/440, 456.1–457
See application file for complete search history.

(56) References Cited

U.S. PATENT DOCUMENTS

| | | | | |
|---|---|---|---|---|
| 2009/0274069 | A1* | 11/2009 | Olsson | H04W 48/16 |
| | | | | 370/255 |
| 2013/0044707 | A1* | 2/2013 | Chen | H04W 72/1231 |
| | | | | 370/329 |
| 2014/0016614 | A1* | 1/2014 | Velev | H04W 4/005 |
| | | | | 370/331 |
| 2014/0226576 | A1* | 8/2014 | Gupta | H04W 56/00 |
| | | | | 370/329 |
| 2014/0378068 | A1* | 12/2014 | Jung | H04W 24/10 |
| | | | | 455/67.11 |

* cited by examiner

FIG. 4

SYSTEM AND METHOD FOR WIRELESS NETWORK ACCESS MAP AND APPLICATIONS

This application claims the benefit of U.S. Provisional Application No. 61/810,617 filed on Apr. 10, 2013 by Hang Zhang et al. and entitled "System and Method for Location-Based Wireless Network Discovery," which is hereby incorporated herein by reference as if reproduced in its entirety.

TECHNICAL FIELD

The present invention relates to the field of wireless network communications, and, in particular embodiments, to a system and method for wireless network access MAP and applications.

BACKGROUND

In current wireless networks, a terminal needs to perform network discovery and physical connection establishment in a number of operation modes/states, such as, in initial network access state for getting initial network access, in power-saving mode (e.g., idle mode) for continuously monitoring the tracking area for location update, or in connection mode (e.g., active mode) for handover. The search includes carrier/channel search, time synchronization, frame boundary search, etc. Current network discovery/search generally is based on a blind physical layer (PHY) search and measurement by the user equipment (UE). The complexity of this operation depends on the size of search space. The blind search and measurement approach is both time and battery power consuming for the UE or mobile terminal.

In evolving wireless networks such as fifth generation (5G) dense heterogeneous network (HetNet) deployment, UE discovery of a small cell may be difficult using strictly PHY measurement by the UE, for example due to a strong macro signal. Similarly, in a 5G multi-interface/multi-carrier band co-existing network, network discovery/search is difficult using only PHY measurements due the much larger search space. This approach can be problematic for mobile terminal handover (HO) in active state and for tracking area(TA) tracking in power saving mode in 5G implementation, for example. The problems above become more severe in dense wireless network implementation. There is a need for an improved wireless network discovery/search and physical connection establishment method that overcomes such issues.

SUMMARY OF THE INVENTION

In accordance with an embodiment, a method by a network component for location based network discovery and network access includes establishing network access MAP information indicating a list of geographic coordinates and corresponding tracking area identifiers (IDs) for defined geographic location within a geographic region. The network access MAP information is transmitted to a user equipment (UE).

In accordance with another embodiment, a method by a UE for location based network discovery and establishment of connection with a wireless network includes receiving network access MAP information from a network, and detecting a current location of the UE. Upon deciding to establish a wireless connection, a search space for network discovery is determined in accordance with the network access MAP information and the current location of the UE. The method further includes performing downlink (DL) search and measurement in the search space, and establishing a wireless connection, wherein the wireless connection is a DL connection, an uplink (UL) connection, or both.

In accordance with yet another embodiment, a user device for location based network discovery and network access includes at least one processor and a non-transitory computer readable storage medium storing programming for execution by the at least one processor. The programming includes instructions to receive network access MAP information from the network, and detect a current location of the user device. Upon deciding to establish a wireless connection, a search space for network discovery is determined in accordance with the network access MAP information and the current location of the user device. The device is further configured to perform DL search and measurement in the search space, and establish a wireless connection, wherein the wireless connection is a DL connection or an UL connection.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In current implementations of UE triggered network discovery and radio connection establishment, the UE needs to perform downlink (DL) acquisition and uplink (UL) synchronization. Downlink acquisition includes frequency band search, frame synchronization, and cell information acquisition. The UL transmission synchronization includes alignment, code acquisition, and power ramp up. Typically, the network discovery approach is a blind search of radio nodes (e.g., base stations, relays, Femto cells) and physical (PHY) measurement by the UE. The blind search involves continuous search and measurement of signals within the range of the UE. This approach is slow and power consuming. Another disadvantage is that this approach may not discover a small cell (with low transmission power) when the small cell overlays with a macro cell, e.g., due to the higher signal strength of the macro cell that can overshadow the small cell's signal. Therefore it is difficult to efficiently offload traffic from a high power radio node to another low power radio node using such approach. Further, for evolving or future radio access networks (RANs), large range of carriers can be supported by radio nodes, and each radio node can support a different/configurable air interface, which makes the search space much larger than in current systems and makes the blind search based network discovery/acquisition approach more complicated and time/energy consuming.

The current location update/location tracking approach, when a UE is in power saving mode (e.g., idle), is also based on blind search and PHY layer measurement. The UE needs to continuously search, measure and acquire the near-by network nodes DL to get tracking area (TA) information. The UE needs to register when crossing the boundary of a TA. This approach is also energy demanded.

Location or positioning technology of UE (or UE positioning) is becoming more mature. For instance, location information can be obtained by a UE equipped with a Global Positioning System (GPS), a high accuracy in-door positioning tool, or a location estimation tool. Embodiments are provided herein for a location-based network discovery and connection establishment schemes that takes advantage of location/positioning technology of UE and resolves the issues above of the blind search approaches. The location-based network discovery and connection establishment schemes use UE location information and network access MAP to speed up network discovery, and remove the need for continuous search and measurement by the UE. The provided schemes also reduce the search space, as described below. Specifically, a wireless network access map (MAP) is provided to the UE. The UE uses the MAP information with UE current location information to reduce the search space and speed up network discovery and radio connection establishment with the network. Network operators can use this network access MAP to control the network access and manage the network load distribution. The network access MAP can be customized for each UE.

Figure 1:
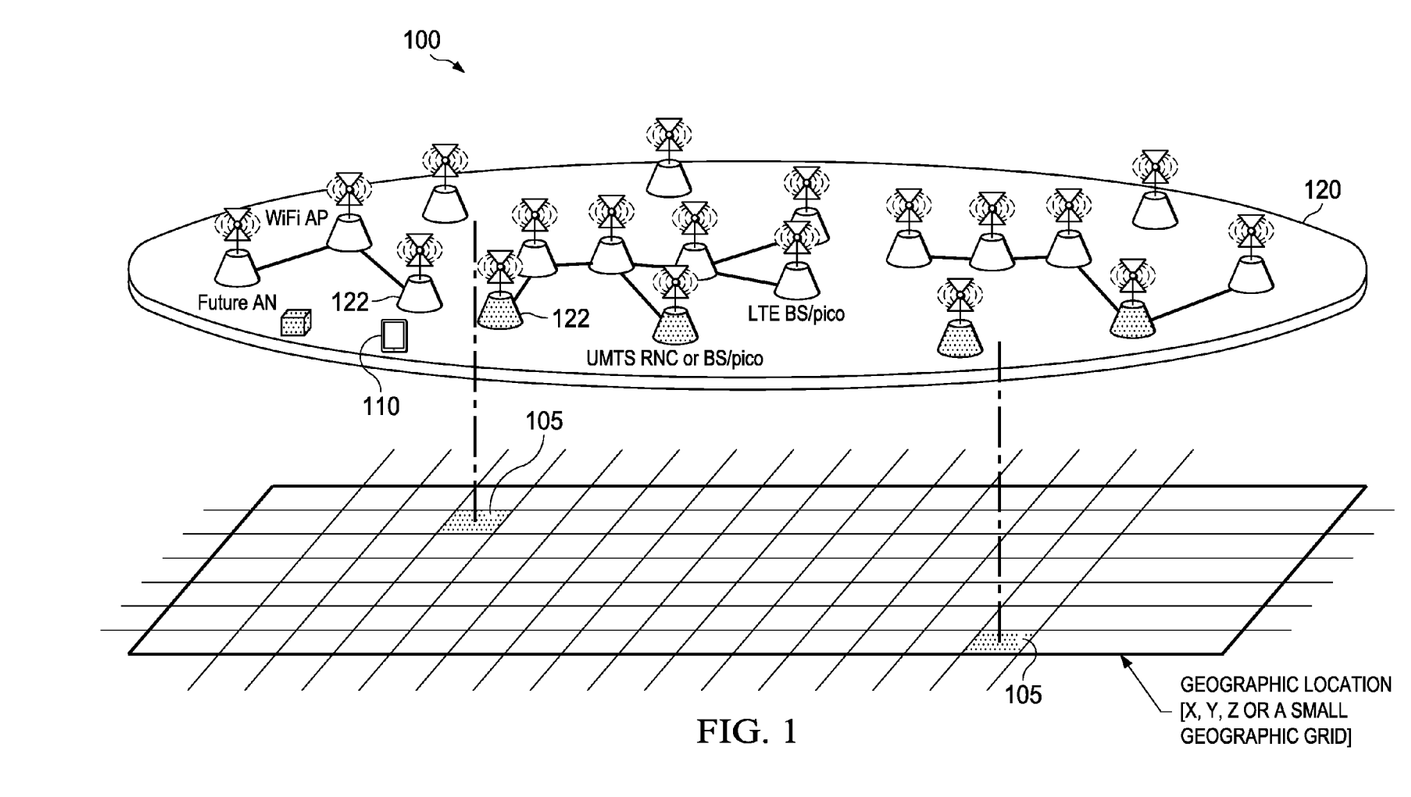
FIG. 1 illustrates an embodiment of a network discovery scheme combining UE location detection and network access MAP information.

FIG. 1 shows an embodiment of a network discovery system 100 that combines UE geographic location and network access MAP to enable network discovery features and other applications. The system 100 improves and speeds up wireless network discovery/search, which translates into time and energy savings for mobile terminals or UEs which can substantially change the mobile operation mode. The system 100 is further advantageous in densely deployed, multiple-interface co-existing, and/or multi-band co-existing wireless networks, where the search and measurement for discovery purpose is more challenging. In the system 100, a UE 110 receives a network access MAP from a network 120 which includes network nodes 122. The UE 110 can be any mobile terminal device or wireless communication device, such as a smartphone, computer tablet, desktop, or sensor. The network 120 may be a wireless network operated by a service provider or a group of wireless networks of same or different technologies (e.g., GSM, CDMA, 3GPP, WLAN/WiFi, or others) by different providers. The MAP information can be sent directly to the UE 110 in a system information message, e.g., upon detecting the UE 110 by the network 120 or a radio node 122. Alternatively, the system message is broadcasted periodically by the network 120 or radio node 122. Delivering the MAP to the UE 110 may be time driven, for instance using scheduled or periodic transmissions by the network 120. Alternatively, delivering the MAP may be event driven, for instance if the UE 110 reaches the edge of a certain tracking area or region associated with the MAP, and hence needs MAP information for a new area. Network topology changes (e.g., addition or removal of radio nodes) is another event that can trigger MAP delivery to the UE. The radio node 122 may be a cellular radio node, e.g., a base station or relay. Alternatively, the radio node 122 may be a WLAN/WiFi access point (AP) or any other wireless technology access node.

The network access MAP information includes any information about the radio nodes 122 and further information enabling the UE 110 to select a suitable radio node 122 to establish a connection with the network 120. For each defined geographic location/bin 105, there is an entry in the MAP which covers this location/bin 105. As used herein the term bin indicates a defined location, for instance a location with predefined square or rectangular boundaries. The geographic location/bin 105 may be, for example, a radius of a few or tens of meters centered by a location entry. For each entry, there is a group of information associated. For instance, for each entry, the MAP information indicates the corresponding tracking area (TA) ID for the purpose of location tracking of mobile terminal, and the topology information of near-by network centered around the location entry/bin. The tracking area may be larger than and include a plurality of geographical areas/bins 105, and hence multiple location entries may have the same TA ID. For example, a tracking area may include hundreds or thousands of bins. The MAP may include tens or hundreds of TA IDs. The topology information includes, for each entry, the list of near-by cell IDs/virtual cell IDs/super cell IDs, and for each such cell the detailed operation information that is necessary for a mobile terminal to establish connection with the network. For each entry, the MAP information may also include a price and/or cost list for a list of quality of experience (QoE) levels, at the cells or TAs.

Table 1 shows an embodiment of the MAP information sent to the UE 110. The MAP may contain information covering a certain geographical area or region, for example a radius of hundreds of meters/kilometer. The MAP information includes entries of geographical coordinates (x, y, z) for corresponding defined locations/bins. For each entry, there is corresponding tracking area ID to which this location/bin belongs. For each entry, a plurality of cell IDs of available near-by cells corresponding to a plurality of radio nodes 122 can be included. The cell IDs may also correspond to super cells corresponding to a group of radio nodes 122, also referred to as virtual radio nodes. For each cell ID, connection parameters indicating search, measurement, and connection options for the mobile terminal can be included, such as carrier, power, and/or antenna connection options for that cell. Additionally, for each cell, the MAP can indicate the allowed access code/resource translation rule and air-interface. The MAP may also include the load statistics for each cell, and a corresponding operator ID and price for connection. In other embodiments, some subset of the MAP information shown in Table may be sent to the UE 110. For example, the MAP may include only the geographical coordinates (x, y, z) and corresponding TAs. In another embodiment, the MAP may include the geographical coordinates (x, y, z), the corresponding TAs, and a list of cell IDs of near-by cells. Additional information, such as the connection parameters, interface type, and price, may also be sent to the UE 110 upon request.

UE 110, and subsequently the secondary MAP can be provided upon demand. In other implementation, the primary MAP may include information regarding primary radio nodes and the secondary MAP includes information about remaining secondary radio nodes in the area. For example, the primary nodes are macro cell nodes, and the secondary nodes are small or Femto cell nodes.

In an embodiment, the MAP is customized, e.g., by the network 120 or an area MAP manager, for each UE 110 to show a corresponding subset of topology and hence provide a controlled access to that UE 110. For example, the MAP

TABLE 1

MAP information

| Location | | | | | | | |
|---|---|---|---|---|---|---|---|
| [x1, y1, z1] | Tracking Area ID | Cell ID 1 | Carrier/power/antenna | Access code or Resource translation rule | Air-interface | Load statistics | Operator ID/Price |
| | | Cell ID2 | Carrier/power/antenna | Access code or Resource translation rule | Air-interface | Load statistics | Operator ID/Price |
| | | Cell ID 3 | Carrier/power/antenna | Access code or Resource translation rule | Air-interface | Load statistics | Operator ID/Price |
| | | . . . | Carrier/power/antenna | Access code or Resource translation rule | Air-interface | Load statistics | Operator ID/Price |
| [x2, y2, z2] | Tracking Area ID | Cell ID 4 | Carrier/power/antenna | Access code or Resource translation rule | Air-interface | Load statistics | Operator ID/Price |
| | | Cell ID 5 | Carrier/power/antenna | Access code or Resource translation rule | Air-interface | Load statistics | Operator ID/Price |
| | | Cell ID 6 | Carrier/power/antenna | Access code or Resource translation rule | Air-interface | Load statistics | Operator ID/Price |
| . . . | | | | | | | |

In an embodiment, the MAP is managed by an area MAP manager in the network 120, which may be assigned to a geographical area or region, such as a state, a metropolitan area, a city, or a town. In an area where multiple operators deploy their networks, the operators may communicate with the MAP manager to provide topology information of their networks. An owner of private radio node may also communicate with the MAP manager to provide topology information of the private node, e.g., if the owner of the private node wants to sell its connectivity service. In another embodiment, multiple MAPs are provided for one area. For instance, multiple operators can manage and provide their corresponding MAPs without an area MAP manager.

In an embodiment, multiple types of MAPs are used for different users or network conditions. The different MAP types include different detail levels of information. For example, a primary MAP includes the tracking area IDs only and a secondary MAP includes other details such as shown in Table 1. The primary MAP may be provided first to the information may only include information of a subset of radio nodes 122 selected according to the UE's network parameters, connection capability (e.g., WiFi or no WiFi access), application (e.g., real-time or best effort), quality of service (QoS), subscription class, or other criteria. In one implementation, the MAP information is customized to provide a specific topology shape for the UE 110 based on the available mobility prediction and prediction accuracy. For example, if the UE's mobility pattern is deemed to be that of a traveling user on a highway, then the MAP shape is customized to provide radio node information along a line or trajectory matching that of the highway. This can facilitate and improve network discovery (reduces search and measurement time), connection, and HO operations. The MAP may also be customized for load control and energy saving at the network 120. For instance, the MAP can be customized for one area to plan traffic load according to network load information. As such, radio nodes 122 with relatively lower traffic in the area are only included in the MAP information for a UE 110. The MAP can also be customized for energy saving where some radio nodes 122 with relatively low battery in the area are hidden and not shown in the MAP information sent to the UE 110.

In an embodiment, the network 120 negotiates a plurality of MAP parameters with the UE 110 to configure and send the network access MAP. The MAP parameters may include the MAP size (e.g., the MAP geographic area or region), the MAP type (e.g., primary and secondary MAP), the update interval for retransmitting the MAP information, or other parameters related to determining the MAP information and sending the resulting MAP to the UE 110. The MAP can also be customized per-terminal, for instance via negotiation between the network 120 and the UE 110, to determine the MAP size, the MAP update interval, the MAP information such as the number of radio nodes 122 for each location/bin and information related to each radio node 122, the MAP shape, and/or other MAP parameters. For instance, the different MAP parameters may be determined for a UE 110 based on the UE's battery, application quality of experience (QoE), accuracy of positioning, memory size, or other criteria of the UE that can benefit from configuring the MAP accordingly.

In an embodiment, a network operator implements controlled access for a UE 110 by customizing the MAP information for that UE 110, as described above. For instance, the network operator includes a subset of topology (including a subset of radio nodes 122) in the MAP sent to the UE 110, thus forcing restricted access to the included radio nodes 122 and preventing access to other (hidden) radio nodes 122 that may be in the neighborhood of the UE 110. As such, the operator can provide different controlled access to different customers. By customizing the MAP information (using a selected subset of the topology), the network operator can also implement load control and energy saving on the network side. For instance, the MAP can be customized for traffic load planning, according to network load information, per area. The MAP can also be customized for energy saving at the radio nodes 122, e.g., by hiding lower energy/battery radio nodes 122 from the topology.

In the case of UE triggered connection establishment, the UE 110 checks its current location, e.g., its coordinates (x, y, z), and accordingly obtains the neighborhood topology information from the MAP. This can be triggered when a UE 110 for example detects a new tracking area or decides to send UL data. For instance, the UE 110 obtains the list of associated cell IDs closest to its coordinates. The UE 110 also obtains, for each cell ID, the connection parameters/options, such as carrier, power, and/or antenna configuration, access code/resource translation rule, air-interface, load statistics, operator ID and/or price for connection. The UE 110 can then determine which cell(s) to search and how to search, based on the connection parameters/options (e.g., frequency band and air-interface), for cells or radio nodes 122, e.g., for DL synchronization and/or UL transmission.

In the case of network triggered connection establishment, the UE 110 can check its current location, e.g., its coordinates (x, y, z), during a network paging window or any scheduled DL transmission window. Accordingly, the UE 110 obtains the neighborhood topology information from the MAP. The UE 110 also obtains the connection parameters for the neighborhood topology, as described in the case of UE triggered connection establishment. The UE 110 can then determine which cell(s) and how to search, based on the connection parameters (e.g., frequency band and air-interface), for cells or radio nodes 122. The UE 110 may send a response to the network 120 indicating its current location, e.g., upon receiving paging information from the network 120. The UE 110 then establishes a connection with the network 120 for DL/UL communications.

In both UE and network triggered connection establishment cases above (location update procedure can be viewed as one example of UE triggered connection establishment), the UE 110 does not need to continuously perform search and measurement and searches a limited space (obtained from the MAP) in the neighborhood of the current UE location. For the purpose of location update, without continuous search and measurement, the UE 110 only needs to continuously compare its current location (e.g., as obtained by GPS) with the TA ID indicated in the MAP to recognize the TA has changed. In this case, the UE 110 sends a location update request to the network 120. Further, since the MAP information provide the UE 110 with knowledge of all cells or radio nodes within proximity to the UE's current location, the UE 110 becomes able to detect any indicated radio node 122 regardless whether the node is a macro cell or a small cell/low power node.

Establishing a DL connection may include the UE performing a plurality of necessary operations before the UE is able to read a DL broadcast message and receive its DL data. Examples of such necessary operations includes include searching and measuring a DL signal, slot synchronization, frame synchronization, or other operations. Establishing an UL connection mat include performing a plurality of necessary operations before the UE is able to transmit its UL data. Examples of such operations include performing initially DL establishment or directly performing UL transmission using the network access MAP information.

In one scenario, when an idle UE 110 (not in current communication) enters a paging window (in the case of network triggered connection establishment), the UE 110 uses the MAP information to determine the search space relevant to the current location of the UE 110 and perform DL search and measurement to establish a DL connection with the network 120. In this case, the UE 110 does not need to continuously search for networks/radio nodes before and during the paging window, as done in the typical blind search approach. Further, the search space comprises a smaller number of measurement and connection options/possibilities than the typical case of using a blind search approach (without UE location information and network access MAP information) since in the blind search approach the UE is blindly searching for any possible operation configurations in its area. The UE 110 further monitors the paging message during the paging window, and upon receiving the DL data, sends an UL acknowledgement.

In another scenario, when an idle UE 110 detects a new TA ID (enters a new tracking area), the UE 110 uses the TA ID location indicated in the MAP and its current location (e.g., obtained by GPS) to recognize the location change. According to the MAP information and the UE's current location, the UE 110 is able to determine a smaller search space, e.g., in the neighborhood of the UE 110 and using the indicated carrier(s) and interface(s). The UE 110 then performs DL search and measurement and connects with the network 120 via a selected radio node 122. The UE 110 can then send UL data for location update. In yet another scenario, when an idle UE 110 has UL data to send, the UE 110 uses the MAP information to determine the search space, and accordingly performs DL search and measurement to establish a connection and send the UL data. In yet another scenario for an active UE 110 (in current communication with a network), the UE continuously search and measure the near-by cells using the MAP information and UE's current location as in the scenarios above.

In the scenarios above, the UE 110 determines the search space and begins the search and measurement according to any of the following reasons while in idle mode: detecting start of a paging window, detecting new TA ID, or deciding to send UL data; or for active communication with the network while in active/connected mode. This removes the need to perform continuous physical link search and measurement and hence saves battery power in all the scenarios above. The reduced search space also reduces the connection establishment time and further saves battery power.

Figure 2:
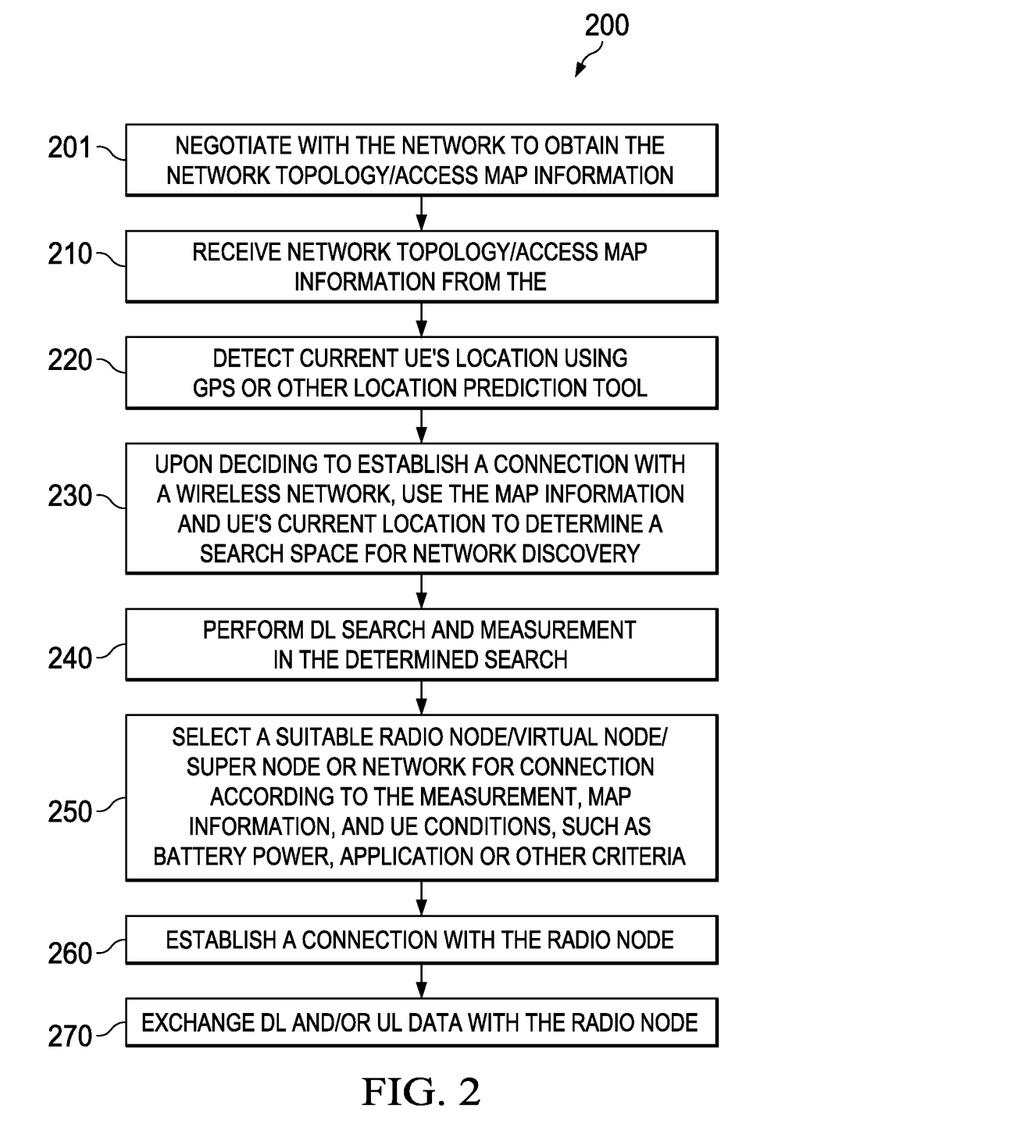
FIG. 2 illustrates an embodiment of a method for using network access MAP information and UE location detection for network discovery.

FIG. 2 shows an embodiment of a method 200 by a UE for using MAP information for network discovery. At step 201, the UE negotiates with the network to obtain the network access MAP information, as described above. At step 210, the UE receives network access MAP information from the network. The MAP information may be broadcasted by the network periodically (e.g., as part of a system information message) or may be sent to the UE using a dedicated message. At step 220, the UE detects its current location, e.g., using GPS, a high accuracy in-door positioning tool, or any suitable location estimation tool. At step 230, upon deciding to establish a connection with a wireless network, the UE uses the MAP information and its current location to determine a search space for network discovery. For example, the UE may be triggered to establish a connection for any of the reasons described in the scenarios above. At step 240, the UE performs DL search and measurement in the determined search space. At step 250, the UE selects a suitable radio node/virtual node/super node or network for connection according to the measurement, MAP connection parameters, and UE conditions, such as battery power, application, or other criteria. At step 260, the UE establishes a connection with the radio node. At step 270, the UE exchanges DL and/or UL data with the radio node.

Figure 3:
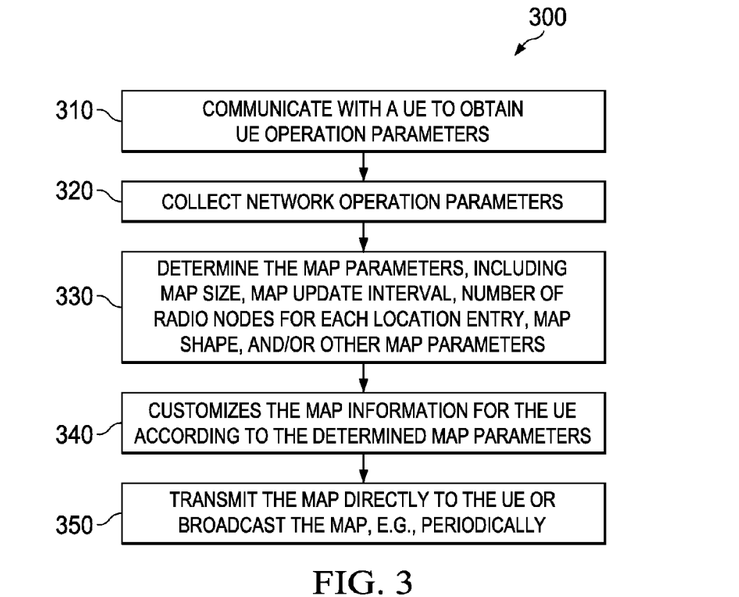
FIG. 3 illustrates an embodiment of a method for customizing network access MAP information for a UE.

FIG. 3 shows an embodiment of a method 300 for customizing network access MAP information for a UE. At step 310, a network component communicates with a UE to obtain UE operation parameters, such as UE battery power level, running applications, QoE, QoS required, accuracy of positioning, memory size, or other parameters. For instance, the network component may be a network controller, an area MAP manager, or a radio node. At step 320, the network component collects network operation parameters, such as traffic load information and/or energy levels at radio nodes. At step 330, the network component determines the MAP parameters, including MAP size, MAP update interval, number of radio nodes for each location entry, MAP shape, and/or other MAP parameters according to the UE operation parameters and the network operation parameters. At step 340, the network customizes the MAP information for the UE according to the determined MAP parameters. At step 350, the MAP is transmitted directly to the UE or broadcast the MAP, e.g., periodically. Downloading or updating the MAP to the UE can be triggered by different factors. For example, MAP download or update can be triggered by events such as the UE approaching the edge of the current MAP at the UE, or change in network topology or other events. MAP download or update can also be triggered by a timer or by change in of tracking area. In an embodiment, MAP updates are subsequently transmitted or broadcasted upon changes to network topology, e.g., to add or remove radio nodes.

The network access MAP information may also be used for applications other than network discovery and connection establishment. For instance, the MAP is used by the UE for location based packet delivery. In one embodiment, the network can use any suitable method to indicate (in advance) to the UE instructions on how to perform packet base delivery. Specifically, the network indicates when the UE gets into a specific location bin (e.g., [x1,y1,z1]), the UE should expect to receive DL data from or send UL data to a specific node (e.g., node ID=A) or a group of nodes (Node IDs=A,B,C). After receiving the instructions from the network, the UE then continuously checks its location and accordingly the closest bin. If the UE identifies the indicated bin ID or coordinates [x1,y,1,z1], using the MAP information, the UE establishes a connection with the specified node (node ID=A) to obtain DL data or send UL data. In another embodiment, the network instructs (in advance using any suitable method) the UE that when the UE gets into a specific TA (e.g., TA ID=a), the UE should establish a connection with the network to obtain detailed information on which location bin and which node or group of nodes to expect to receive the DL data from or send UL data to. After receiving this indication, the UE continuously checks its location and the closest bin and corresponding TA ID. If the UE identifies the TA ID=a, the UE establish a connection with the network (via search/measurement/connection establishment steps described above for location based network discovery) and acquires detailed information on which location bin and which node or group of nodes to expect to receive the DL data from or send UL data to. After obtaining this detailed information, the UE again continuously checks its location and accordingly the closest bin. If the UE identifies the indicated bin ID or coordinates [x1,y,1,z1], using the MAP information, the UE establishes a connection with the specified node (node ID=A) to obtain DL data or send UL data.

Figure 4:
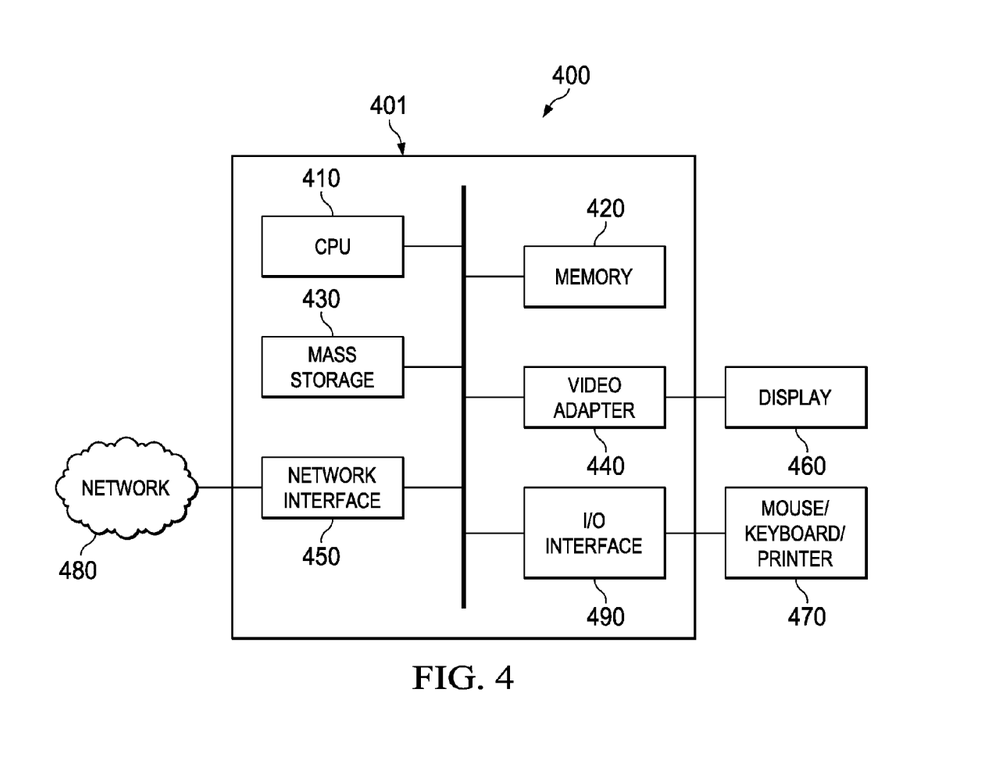
FIG. 4 is a diagram of a processing system that can be used to implement various embodiments.

FIG. 4 is a block diagram of an exemplary processing system 400 that can be used to implement various embodiments. Specific devices may utilize all of the components shown, or only a subset of the components and levels of integration may vary from device to device. For example, the devices include the APs and the STAs of a WLAN or a Wi-Fi system. Furthermore, a device may contain multiple instances of a component, such as multiple processing units, processors, memories, transmitters, receivers, etc. The processing system 400 may comprise a processing unit 401 equipped with one or more input devices, such as a microphone, mouse, touchscreen, keypad, keyboard, and the like. Also, processing system 400 may be equipped with one or more output devices, such as a speaker, a printer, a display, and the like. The processing unit may include central processing unit (CPU) 410, memory 420, mass storage device 430, video adapter 440, and I/O interface 490 connected to a bus 495.

The bus 495 may be one or more of any type of several bus architectures including a memory bus or memory controller, a peripheral bus, video bus, or the like. The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. The mass storage device 430 may comprise any type of storage device configured to store data, programs, and other information and to make the data, programs, and other information accessible via the bus 495. The mass storage device 430 may comprise, for example, one or more of a solid state drive, hard disk drive, a magnetic disk drive, an optical disk drive, or the like.

The video adaptor 440 and I/O interface 490 provide interfaces to couple external input and output devices to the processing unit. As illustrated, examples of input and output devices include the display 460 coupled to the video adapter 440 and the mouse/keyboard/printer 470 coupled to the I/O interface 490. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or different networks. The network interface 450 allows the processing unit 401 to communicate with remote units via one or more networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a user equipment (UE) for location based network discovery and establishment of connection with a wireless network, the method comprising:
   receiving wireless network access map information from a network, wherein the wireless network access map information includes a list of geographic coordinates and corresponding tracking area identifiers (IDs) for a plurality of defined geographic locations in a geographical region, and for each of the defined geographic locations, a list of cell IDs and connection parameters and options for a plurality of cells;
   detecting a current location of the UE;
   upon deciding to establish a wireless connection, determining a search space for network discovery in accordance with the wireless network access map information and the current location of the UE;
   performing downlink (DL) search and measurement in the search space; and
   establishing the wireless connection, wherein the wireless connection is a DL connection, an uplink (UL) connection, or both.

2. The method of claim 1, wherein determining the search space for network discovery includes:
   selecting a close geographic location to the current location of the UE;
   determining radio nodes that are candidates for search, wherein the radio nodes include a physical radio node, a virtual node, or a super node; and
   determining search parameters based on the wireless network access map information.

3. The method of claim 1 further comprising:
   selecting a radio node for the wireless connection in accordance with the DL search and measurement;
   establishing the wireless connection with the radio node; and
   exchanging DL or uplink data with the radio node.

4. The method of claim 3, wherein the radio node is selected for a cell having connection parameters and options suitable for the UE and from which the UE is able to receive sufficient signal strength.

5. The method of claim 1, wherein the connection parameters and options for each of the cell IDs include at least one of carrier, power, and antenna connection options, an allowed access code or resource translation rule, an air-interface, load statistics, an operator ID, and a connection price or cost.

6. The method of claim 1, wherein the current location of the UE is detected by a positioning system available to the UE, wherein determining the search space for network discovery includes:
   comparing the detected current location of the UE with location entries in the wireless network access map information, the location entries indicating location coordinates for the plurality of defined geographic locations in the geographical region;
   finding a closest geographic location in the location entries, wherein the closest geographic location is used to establish the wireless connection; and
   wherein the wireless connection is established in accordance with the detected current location of the UE and information corresponding to the closest geographic location.

7. The method of claim 1, wherein establishing the wireless connection is decided upon detecting a new tracking area (TA).

8. The method of claim 1, wherein establishing the wireless connection is decided for sending uplink data.

9. The method of claim 1, wherein establishing the wireless connection is decided before initiating a hand over or before a serving set of radio nodes for the UE changes.

10. The method of claim 1, wherein establishing the wireless connection includes performing a plurality of necessary operations before the UE is able to read a DL broadcast message and receive its DL data, and wherein performing the necessary operations includes searching and measuring a DL signal, slot synchronization, and frame synchronization.

11. The method of claim 1, wherein establishing the wireless connection includes performing a plurality of necessary operations before the UE is able to transmit its UL data, and wherein performing the necessary operations includes performing DL establishment or direct UL transmission using the wireless network access map information.

12. The method of claim 1 further comprising:
receiving instructions from the network for performing location based packet delivery, the instructions indicate a location coordinate and one or more radio nodes for the UE to receive DL data from or to send UL data to;
continuously checking current location of the UE and a closest location to the UE using global positioning system (GPS) and the wireless network access map information;
upon identifying the indicated location as the closest location, establishing a connection with an indicated radio node; and
receiving DL data or sending UL data via the connection with the indicated radio node.

13. The method of claim 1 further comprising:
receiving instructions from the network for performing location based packet delivery, the instructions indicate a tracking area (TA) identifier (ID) for triggering the UE to obtain further instructions for performing the location based packet delivery;
continuously checking current location of the UE, a closest location to the UE, and a corresponding TA ID using global positioning system (GPS) and the wireless network access map information; and
upon identifying the indicated TA ID corresponding to the closest location, establishing a connection with the network using DL search and measurement in accordance with the wireless network access map information and the indicated TA ID;
obtaining via the connection further instructions for performing the location based packet delivery, the further instructions for performing the location based packet delivery indicating a location and one or more radio nodes for the UE to receive DL data from to send UL data to;
continuously checking current location of the UE and a closest location to the UE using GPS and the wireless network access map information;
upon identifying the indicated location as the closest location, establishing a connection with an indicated radio node; and
receiving DL data or sending UL data via the connection with the indicated radio node.

14. A user device for location based network discovery and network access, the user device comprising:
at least one processor; and
a non-transitory computer readable storage medium storing programming for execution by the at least one processor, the programming including instructions to:
receive wireless network access map information from a network, wherein the wireless network access map information includes a list of geographic coordinates and corresponding tracking area identifiers (IDs) for a plurality of defined geographic locations in a geographical region, and for each of the defined geographic locations, a list of cell IDs and connection parameters and options for a plurality of cells;
detect a current location of the user device;
upon deciding to establish a wireless connection, determine a search space for network discovery in accordance with the wireless network access map information and the current location of the user device; and
perform downlink (DL) search and measurement in the search space; and
establish the wireless connection, wherein the wireless connection is a DL connection or an uplink (UL) connection.

15. The user device of claim 14, wherein the programming includes further instructions to:
select a radio node for the wireless connection in accordance with the DL search and measurement;
establish the wireless connection with the radio node; and
exchange DL or UL data with the radio node.

16. The user device of claim 14, wherein the connection parameters and options for each of the cell IDs include at least one of carrier, power, and antenna connection options, an allowed access code or resource translation rule, an air-interface, load statistics, an operator ID, and a connection price or cost.

17. The method of claim 1, wherein the connection parameters and options for each of the cell IDs include at least one of carrier, power, and antenna connection options, an allowed access code or resource translation rule, an air-interface, load statistics, an operator ID, and a connection price or cost.

18. The user device of claim 14, wherein the instructions to determine the search space for network discovery include instructions to:
select a close geographic location to the current location of the UE;
determine radio nodes that are candidates for search, wherein the radio nodes include a physical radio node, a virtual node, or a super node; and
determine search parameters based on the wireless network access map information.

19. The user device of claim 15, wherein the radio node is selected for a cell having connection parameters and options suitable for the UE and from which the UE is able to receive sufficient signal strength.

20. The user device of claim 14, wherein the connection parameters and options for each of the cell IDs include at least one of carrier, power, and antenna connection options, an allowed access code or resource translation rule, an air-interface, load statistics, an operator ID, and a connection price or cost.

21. The user device of claim 14, wherein the current location of the UE is detected by a positioning system available to the UE, wherein the instructions to determine the search space for network discovery include instructions to:
compare the detected current location of the UE with location entries in the wireless network access map information, the location entries indicating location coordinates for the plurality of defined geographic locations in the geographical region;
find a closest geographic location in the location entries, wherein the closest geographic location is used to establish the wireless connection; and
wherein the wireless connection is established in accordance with the detected current location of the UE and information corresponding to the closest geographic location.

22. The user device of claim 14, wherein the programming includes further instructions to decide to establish the wireless connection upon detecting a new tracking area (TA).

23. The user device of claim 14, wherein the programming includes further instructions to decide to establish the wireless connection for sending uplink data.

24. The user device of claim 14, wherein the programming includes further instructions to decide to establish the wireless connection before initiating a hand over or before a serving set of radio nodes for the UE changes.

25. The user device of claim 14, wherein the instructions to establish the wireless connection include instructions to perform a plurality of necessary operations before the UE is able to read a DL broadcast message and receive its DL data, and wherein the instructions to perform the necessary operations include instructions to search and measure a DL signal, slot synchronization, and frame synchronization.

26. The user device of claim 14, wherein the instructions to establish the wireless connection include instructions to perform a plurality of necessary operations before the UE is able to transmit its UL data, and wherein the instructions to perform the necessary operations include instructions to perform DL establishment or direct UL transmission using the wireless network access map information.

27. The user device of claim 14, further comprising instructions to:
receive network instructions from the network for performing location based packet delivery, the network instructions indicate a location coordinate and one or more radio nodes for the UE to receive DL data from or to send UL data to;
continuously check current location of the UE and a closest location to the UE using global positioning system (GPS) and the wireless network access map information;
upon identifying the indicated location as the closest location, establish a connection with an indicated radio node; and
receive DL data or sending UL data via the connection with the indicated radio node.

28. The user device of claim 14 further comprising instructions to:
receive network instructions from the network for performing location based packet delivery, the network instructions indicate a tracking area (TA) identifier (ID) for triggering the UE to obtain further network instructions for performing the location based packet delivery;
continuously check current location of the UE, a closest location to the UE, and a corresponding TA ID using global positioning system (GPS) and the wireless network access map information; and
upon identifying the indicated TA ID corresponding to the closest location, establish a connection with the network using DL search and measurement in accordance with the wireless network access map information and the indicated TA ID;
obtain via the connection additional network instructions for performing the location based packet delivery, the additional network instructions for performing the location based packet delivery indicating a location and one or more radio nodes for the UE to receive DL data from to send UL data to;
continuously check current location of the UE and a closest location to the UE using GPS and the wireless network access map information;
upon identifying the indicated location as the closest location, establish a connection with an indicated radio node; and
receive DL data or sending UL data via the connection with the indicated radio node.

29. A method for establishment of a wireless connection with a wireless network, the method comprising:
obtaining, by a user equipment (UE), network access map information from the wireless network, wherein the network access map information comprises at least a list of geographic coordinates and corresponding tracking area identifiers (IDs) for a plurality of defined geographic location in a geographical region; and
establishing, by the UE, the wireless connection with the wireless network based on the network access map information and a current location of the UE.

30. The method of claim 29, wherein the network access map information further comprises a list of cell identifiers (IDs) and connection parameters and options for a plurality of cells in each indicated location entry in the network access map information.

31. The method of claim 30, wherein the connection parameters and options for each of the cell IDs include at least one of carrier, power, and antenna connection options, an allowed access code or resource translation rule, an air-interface, load statistics, an operator ID, or a connection price or cost.

32. The method of claim 29, before establishing the wireless connection, further comprising:
determining, by the UE, a search space for network discovery in accordance with the network access map information and the current location of the UE; and
performing, by the UE, a downlink (DL) search and measurement in the search space.

33. The method of claim 32, further comprising:
selecting a radio node for the wireless connection in accordance with the DL search and measurement; and
establishing the wireless connection with the radio node.

34. The method of claim 32, wherein determining the search space for network discovery includes:
selecting a close geographic location to the current location of the UE;
determining radio nodes that are candidates for search, wherein the radio nodes include a physical radio node, a virtual node, or a super node; and
determining search parameters based on the network access map information.

35. The method of claim 29, wherein the network access map information comprises map parameters including at least one of a map size, map level of details, a number of radio nodes per location, a map update interval, or a map shape, wherein the network access map information is established according to the map parameters.

36. A user equipment (UE) comprising:
at least one processor; and
a non-transitory computer readable storage medium storing programming for execution by the at least one processor, the programming including instructions for:
obtaining network access map information from a wireless network, wherein the network access map information comprises at least a list of geographic coordinates and corresponding tracking area identifiers (IDs) for a plurality of defined geographic location in a geographical region; and
establishing a wireless connection with the wireless network based on the network access map information and a current location of the UE.

37. The UE of claim 36, wherein the network access map information further comprises a list of cell identifiers (IDs) and connection parameters and options for a plurality of cells in each indicated location entry in the network access map information.

38. The UE of claim 37, wherein the connection parameters and options for each of the cell IDs include at least one of carrier, power, and antenna connection options, an allowed access code or resource translation rule, an air-interface, load statistics, an operator ID, or a connection price or cost.

39. The UE of claim 36, wherein the programming further includes instructions for, before establishing the wireless connection:
- determining, by the UE, a search space for network discovery in accordance with the network access map information and the current location of the UE; and
- performing, by the UE, a downlink (DL) search and measurement in the search space.

40. The UE of claim 39, wherein the programming further includes instructions for:
- selecting a radio node for the wireless connection in accordance with the DL search and measurement; and
- establishing the wireless connection with the radio node.

41. The UE of claim 39, wherein the instructions for determining the search space for network discovery include instructions for:
- selecting a close geographic location to the current location of the UE;
- determining radio nodes that are candidates for search, wherein the radio nodes include a physical radio node, a virtual node, or a super node; and
- determining search parameters based on the network access map information.

42. The UE of claim 36, wherein the network access map information comprises map parameters including at least one of a map size, map level of details, a number of radio nodes per location, a map update interval, or a map shape, wherein the network access map information is established according to the map parameters.

\* \* \* \* \*